United States Patent [19]
Andrieu et al.

[11] Patent Number: 6,061,577
[45] Date of Patent: *May 9, 2000

[54] ELECTRICAL POWER SUPPLY CIRCUIT, IN PARTICULAR FOR PORTABLE APPLIANCES

[75] Inventors: Xavier Andrieu, Bretigny sur Orge; Philippe Poignant, Palaiseau, both of France

[73] Assignee: Alcatel, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/575,087

[22] Filed: Dec. 19, 1995

[30] Foreign Application Priority Data

Dec. 20, 1994 [FR] France .................. 94 15335

[51] Int. Cl.$^7$ .................. H04B 7/005
[52] U.S. Cl. .......... 455/572; 455/573; 455/574; 455/127; 323/224; 323/231
[58] Field of Search .............. 455/127, 89, 90, 455/572, 573, 574; 323/224, 231, 268, 269, 282

[56] References Cited

U.S. PATENT DOCUMENTS 4,599,523  7/1986  Pless et al. .................. 307/31
5,079,674  1/1992  Malaspina .
5,180,645  1/1993  More .......................... 455/89
5,187,640  2/1993  Metroka et al. ............. 361/329
5,373,195  12/1994 De Doncker et al. ......... 307/45
5,591,212  1/1997  Keimel ....................... 323/267

FOREIGN PATENT DOCUMENTS

1006603A6  10/1994  Belgium .
0613257A2  8/1994  European Pat. Off. .
WO9212563  7/1992  WIPO .

OTHER PUBLICATIONS

*Patent Abstracts of Japan,* vol. 017, No. 148 (E–1338), Mar. 24, 1993 corresponding to JP–A–04 315320 (Sony Corp) dated Nov. 6, 1992.

Primary Examiner—Andy Rao
Attorney, Agent, or Firm—Sughrue, Mion, Zinn, Macpeak & Seas, PLLC

[57] ABSTRACT

An electricity power supply circuit for an external appliance whose consumption varies over time. The circuit comprises an electrochemical cell, a supercapacitor serving as a source of electricity for said appliance, and a chopper voltage converter between the cell and the supercapacitor, the converter serving to charge the supercapacitor at constant current while monitoring the voltage across the terminals thereof. The circuit is applicable to cellular radiotelephones.

8 Claims, 1 Drawing Sheet

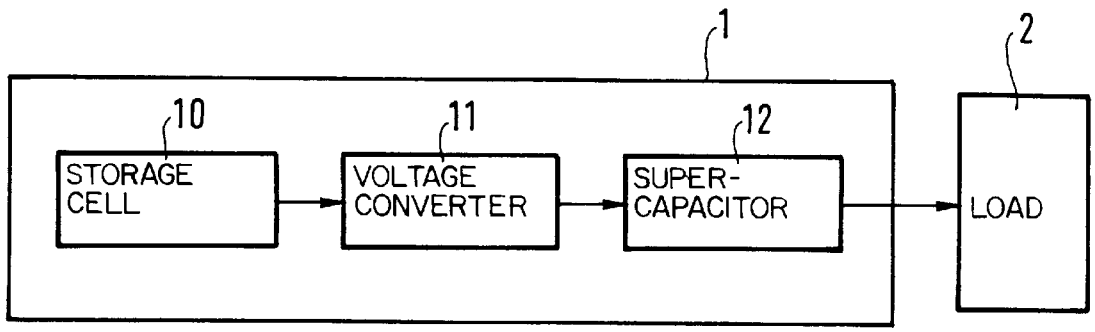
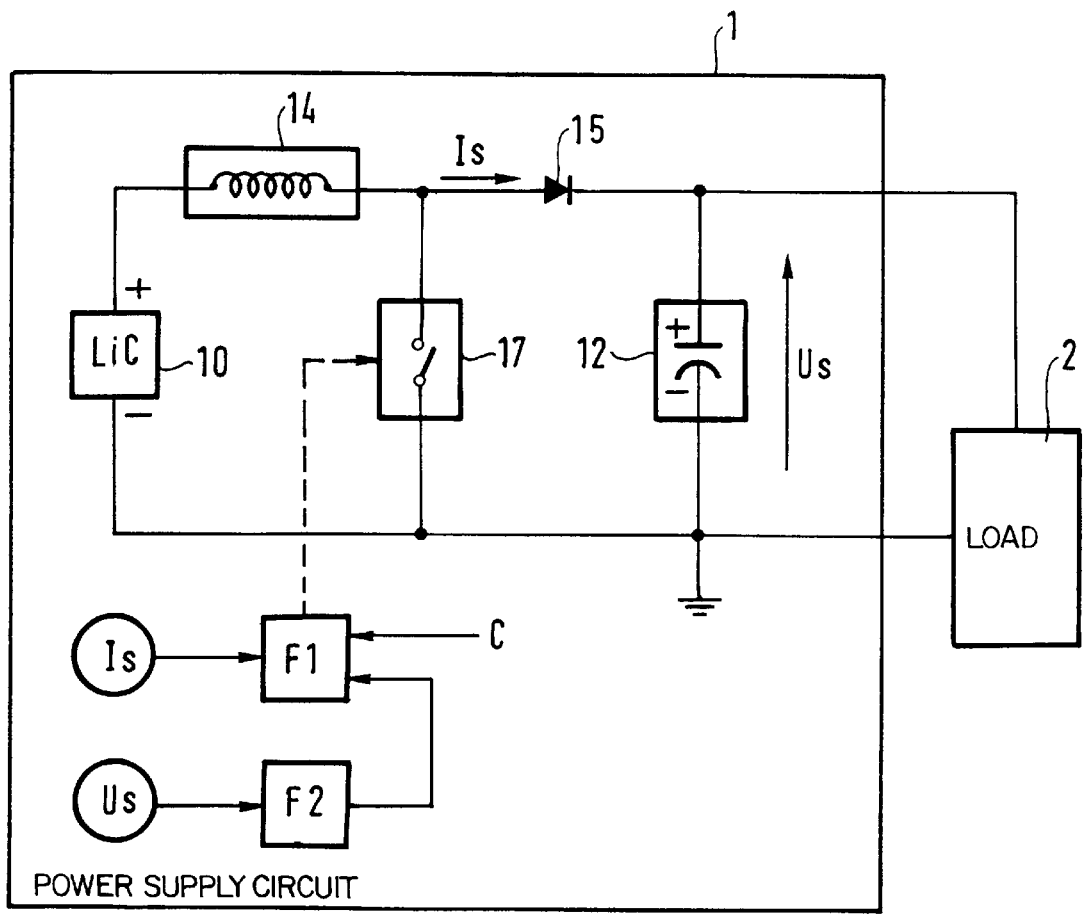

ELECTRICAL POWER SUPPLY CIRCUIT, IN PARTICULAR FOR PORTABLE APPLIANCES

The invention relates to an electrical power supply circuit, in particular for portable appliances such as cellular radiotelephones, e.g. of the GSM type.

BACKGROUND OF THE INVENTION

In the particular case of a cellular radiotelephone, energy consumption is of the pulse type, i.e. it varies over time with peaks during short time intervals, the time intervals where consumption is high typically occurring while the radiotelephone is transmitting.

Conventional electrical power supply circuits for powering portable appliances are available on the market with different capacities and with a variety of electrochemical cells. In this kind of appliance, it is always desirable for the power supply circuit to be as light and as compact as possible while also providing electricity for as long as possible. In other words there is a continuing search for power supply circuits having the best possible energy efficiency.

In addition, since portable appliances of the cellular radiotelephone kind are sensitive to electromagnetic interference, it is desirable for such appliances to have power supply circuits that emit little or no noise interference.

OBJECTS AND BRIEF SUMMARY OF THE INVENTION

The object of the invention is to provide an electricity power supply circuit suitable for delivering high power with good energy efficiency.

Another object of the invention is to propose such a circuit that is suitable for powering a portable appliance such as a radiotelephone, which circuit emits little noise.

To this end, the invention provides an electricity power supply circuit for an external appliance which consumes varying amounts of electricity over time, which circuit is as defined in claim 1. More particularly, the circuit comprises an electrochemical cell, a supercapacitor serving as the electricity source for said appliance, and a chopper voltage converter between the cell and the supercapacitor, the converter operating to charge the supercapacitor at constant current while monitoring the voltage across the terminals thereof. Thus, the electrochemical cell operates at a low average rate, which contributes to increasing its lifetime.

Power demand peaks from the external appliance are absorbed by the supercapacitor which constitutes an electricity storage element.

The efficiency of the chopper voltage converter is optimized because it operates at constant current regardless of variations in the power consumed by the external appliance.

In a particular embodiment of the invention, the electrochemical cell is a lithium-carbon (LiC) storage cell that is lighter and more compact than a traditional nickel-cadmium (NiCd) storage cell. It will thus be understood that the chopper voltage converter extracts maximum benefit from the energy stored in a lithium-carbon storage cell whose voltage decreases during discharge.

In addition, such a power supply circuit is particularly well suited to a portable cellular radiotelephone transmitter/reciever, e.g. of the GSM type, providing means are furnished for switching off the converter during radiotelephone reception so as to reduce the emission of electromagnetic interference coming from the converter. During transmission, power demand peaks are absorbed in full by the supercapacitor which is suitable for delivering the required instantaneous power.

BRIEF DESCRIPTION OF THE DRAWING

An embodiment of the invention is described below in detail with reference to the figures.

FIG. 1 is a simplified general block diagram of the power supply circuit of the invention.

FIG. 2 is a more detailed block diagram of the power supply circuit of the invention.

MORE DETAILED DESCRIPTION

In FIG. 1, the electricity power supply circuit 1 feeds an appliance 2, which may optionally be portable, whose power consumption varies in time, e.g. a GSM type cellular radiotelephone.

The circuit 1 comprises at least one electrochemical cell 10, a voltage converter 11 coupled to the terminals of the cell, and a supercapacitor 12 coupled to the output of the converter and designed to feed electricity to the external appliance 2.

The supercapacitor 12 delivers electricity to the external appliance 2 while the converter 11 recharges the supercapacitor from the cell 10.

The circuit 1 may be provided in the form of a self-contained battery. It is also possible for the supercapacitor to form part of the external appliance, or indeed for the electrochemical cell, the converter, and the supercapacitor to be separate.

FIG. 2 shows the power supply circuit 1 in greater detail.

The circuit thus includes an electrochemical cell 10, or a plurality of cells connected in series. The power supply circuit 1 preferably includes a single lithium-carbon (LiC) storage cell having a positive terminal and a negative terminal.

The circuit also includes a chopper voltage converter coupled to the positive and negative terminals of the cells 10. In this case the converter raises the voltage and is constituted by an inductor 14 connected to the positive terminal of the cell, a diode 15 connected to the inductor 14, a parallel-connected switch 17 connected to the point between the inductor 14 and the diode 15, and a control circuit which modifies the duty ratio of the chopper constituted by the switch 17. The switch 17 is conventionally a power MOSFET.

Finally, the power supply circuit includes the supercapacitor 12 which is coupled in parallel to the output of the diode 15. Such an electricity storage element has very low impedance, large capacitance, and small bulk. It is preferable to use a supercapacitor of the metal oxide or the active carbon type.

The control circuit for the chopper voltage converter is composed of a function F1 controlling opening and closing of the switch 17 and servo-controlled to the current Is flowing into the diode 15. The control circuit also includes a function F2 for switching the converter ON and OFF (via the function F1) as a function of the voltage level Us across the terminals of the supercapacitor 12.

The power supply circuit operates as follows. When the external appliance 2 consumes electricity, it discharges the supercapacitor until the voltage Us across the terminals thereof becomes less than a first threshold. In response to detecting that the first threshold has been crossed, the function F2 switches the converter ON via the function F1. The converter then charges the supercapacitor at constant current Is which is controlled by modifying the duty ratio, with the electricity being taken from the cell 10, and this continues until the voltage Us across the terminals of the supercapacitor reaches a second threshold that is greater than the first threshold. In response to detecting that the second voltage threshold has been crossed, the function F2 switches the converter OFF via the function F1.

The functions F1 and F2 may be implemented respectively by means of a "MAX741" circuit and by means of a "MAX921" circuit as sold by "MAXIM".

Typically, a lithium-carbon storage cell can deliver a voltage of about 4.2 volts when fully charged, and the regulated voltage Us across the terminals of the supercapacitor may be maintained between a first threshold of 4.9 volts and a second threshold of 5 volts. The voltage-raising converter also serves to deliver power from a single LiC cell, thereby solving a problem associated with recharging the cell.

It will be understood that this organization contributes to improving the efficiency of the cell compared with a solution having no supercapacitor, while obtaining an increase in the instantaneous power that is available for the external appliance.

This lightweight and compact power supply circuit is suitable for a portable cellular radiotelephone that operates both in transmission and in reception. In FIG. 2, an external command C serves to switch the converter 11 off while the radiotelephone is receiving.

It should be observed that the supercapacitor averages the electricity consumed from the power supply circuit. As a result it makes it possible to use an electrochemical cell having greater internal impedance.

What is claimed is:

1. An electricity power supply circuit for an external appliance whose power consumption varies over time, the circuit comprising:

an electrochemical cell;

a supercapacitor serving as a source of power for said appliance;

a voltage converting chopper connected to charge the supercapacitor with electricity taken from the cell; and a control circuit for controlling said voltage converting chopper in such a manner that said voltage converting chopper charges the supercapacitor at a controlled, constant current level whenever the voltage across the terminals of the supercapacitor is less that a first threshold, and that said voltage converting chopper ceases to operate when the voltage across the terminals of the supercapacitor reaches a second threshold greater than the first threshold.

2. A circuit according to claim 1, in which the supercapacitor is of the metal oxide or active carbon type.

3. A circuit according to claim 1, in which the electrochemical cell is a lithium-carbon storage cell.

4. A circuit according to claim 1, in which the voltage converting chopper is a voltage-raising converter.

5. A cellular radiotelephone transmitter/receiver comprising:

an electrochemical cell:

a supercapacitor serving as a source of power for said radiotelephone;

a voltage converting chopper connected to charge the supercapacitor with electricity taken from the cell;

a control circuit for controlling said voltage converting chopper in such a manner that said voltage converting chopper charges the supercapacitor at a controlled, constant current level whenever the voltage across the terminals of the supercapacitor is less that a first threshold, and that said voltage converting chopper ceases to operate when the voltage across the terminals of the supercapacitor reaches a second threshold greater than the first threshold; and a switch for switching the voltage converting chopper OFF while the radiotelephone is receiving.

6. The cellular radiotelephone transmitter/receiver according to claim 5, wherein said switch selectively switches the voltage converting chopper such that an emission of electromagnetic interference from the voltage converting chopper is reduced while the radiotelephone is receiving.

7. An electricity power supply circuit as claimed in claim 1, wherein said voltage converting chopper is connected to positive and negative terminals of said electrochemical cell, said voltage converting chopper comprising:

an inductor connected to said positive terminal of said electrochemical cell;

a diode connected to said inductor in series; and a parallel-connected switch connected to a point between said inductor and said diode, and connected to said negative terminal of said electrochemical cell, said switch being controlled by said control circuit.

8. A cellular radiotelephone transmitter/receiver comprising:

an electrochemical cell;

a supercapacitor serving as a source of power for said radiotelephone;

a voltage converting chopper connected to charge the supercapacitor with electricity taken from the cell; and a control circuit for controlling said voltage converting chopper in such a manner that said voltage converting chopper charges the supercapacitor at a controlled, constant current level whenever the voltage across the terminals of the supercapacitor is less that a first threshold, and that said voltage converting chopper ceases to operate when the voltage across the terminals of the supercapacitor reaches a second threshold greater than the first threshold.

* * * * *